United States Patent
Kamamoto et al.

(10) Patent No.: US 9,138,837 B2
(45) Date of Patent: Sep. 22, 2015

(54) METHOD OF MANUFACTURING BEARING RING OF ROLLING BEARING

(71) Applicant: JTEKT CORPORATION, Osaka-shi, Osaka (JP)

(72) Inventors: Shigeo Kamamoto, Kashiwara (JP); Junji Murata, Kashiba (JP)

(73) Assignee: JTEKT CORPORATION, Osaka (JP)

( * ) Notice: Subject to any disclaimer, the term of this patent is extended or adjusted under 35 U.S.C. 154(b) by 170 days.

(21) Appl. No.: 13/909,304

(22) Filed: Jun. 4, 2013

(65) Prior Publication Data

US 2013/0326880 A1    Dec. 12, 2013

(30) Foreign Application Priority Data

Jun. 6, 2012    (JP) ................. 2012-128803

(51) Int. Cl.
| | |
|---|---|
| *B23P 15/00* | (2006.01) |
| *F16C 33/64* | (2006.01) |
| *F16C 33/58* | (2006.01) |
| *F16C 33/66* | (2006.01) |
| *F16C 19/06* | (2006.01) |

(52) U.S. Cl.
CPC ............. *B23P 15/003* (2013.01); *F16C 33/585* (2013.01); *F16C 33/64* (2013.01); *F16C 33/6629* (2013.01); *F16C 33/6681* (2013.01); *F16C 19/06* (2013.01); *Y10T 29/49636* (2015.01)

(58) Field of Classification Search
CPC ...... B23P 15/003; F16C 33/64; F16C 33/585; F16C 33/6629; F16C 33/6681; F16C 19/06; Y10T 29/49636; B24B 19/02
See application file for complete search history.

(56) References Cited

U.S. PATENT DOCUMENTS

| | | | |
|---|---|---|---|
| 3,927,450 A | 12/1975 | Sommer et al. | |
| 4,916,751 A * | 4/1990 | Sumita et al. | 384/516 |
| 6,245,212 B1 | 6/2001 | Girardin et al. | |
| 7,987,598 B2 * | 8/2011 | Yeh et al. | 29/898.02 |
| 2003/0093903 A1 * | 5/2003 | Obara | 29/898.06 |

FOREIGN PATENT DOCUMENTS

JP    A-2001-511713    8/2001

OTHER PUBLICATIONS

Nov. 28, 2014 Extended European Search Report issued in Application No. 13170592.3.

* cited by examiner

*Primary Examiner* — Sarang Afzali
*Assistant Examiner* — Ruth G Hidalgo-Hernande
(74) *Attorney, Agent, or Firm* — Oliff PLC

(57) ABSTRACT

A method of manufacturing a bearing ring of a rolling bearing includes a process of forming a bearing ring material in which a raceway groove is formed, a process of performing form rolling so as to form surface textures in axially opposite end portions of the raceway groove, a heat treatment process, a grinding process, and a super-finishing process.

8 Claims, 3 Drawing Sheets

METHOD OF MANUFACTURING BEARING RING OF ROLLING BEARING

INCORPORATION BY REFERENCE

The disclosure of Japanese Patent Application No. 2012-128803 filed on Jun. 6, 2012 including the specification, drawings and abstract is incorporated herein by reference in its entirety.

BACKGROUND OF THE INVENTION

1. Field of the Invention

The present invention relates to a method of manufacturing a bearing ring of a rolling bearing.

2. Description of Related Art

In general, a raceway groove in a bearing ring of a rolling bearing is finished to be smooth by super-finishing. On the other hand, it has been considered to improve a function of oil discharge, a function of oil supply, and a function of retaining lubrication oil by forming shallow grooves (referred to as "surface texture") or the like on a surface of the raceway groove.

Published Japanese Translation of PCT Application No. 2001-511713 discloses a method of manufacturing a bearing ring of a rolling bearing, in which the surface texture (or a pattern) is formed by electro-chemical machining.

However, in the conventional method of manufacturing a bearing ring of a rolling bearing, the electro-chemical machining is laborious, which leads to high cost.

SUMMARY OF THE INVENTION

One object of the present invention is to provide a method of manufacturing a bearing ring of a rolling bearing, which makes it possible to manufacture a bearing ring of a rolling bearing, which has a surface texture, at low cost.

According to the present invention, there is provided a method of manufacturing a bearing ring of a rolling bearing, in which a bearing ring is formed by performing heat treatment, grinding, and super-finishing on a bearing ring material. The method of manufacturing a bearing ring of a rolling bearing includes performing form rolling so as to form surface textures on surfaces of axially opposite end portions of a raceway groove, in one of a process before the heat treatment and a process between the grinding and the super-finishing.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the present invention will be described with reference to the accompanying drawings. Each of FIG. 1A and FIG. 1B shows an example of a bearing ring of a rolling bearing, which is manufactured by a method of manufacturing a bearing ring of a rolling bearing according to the present invention.

Figures 1A, 1B:
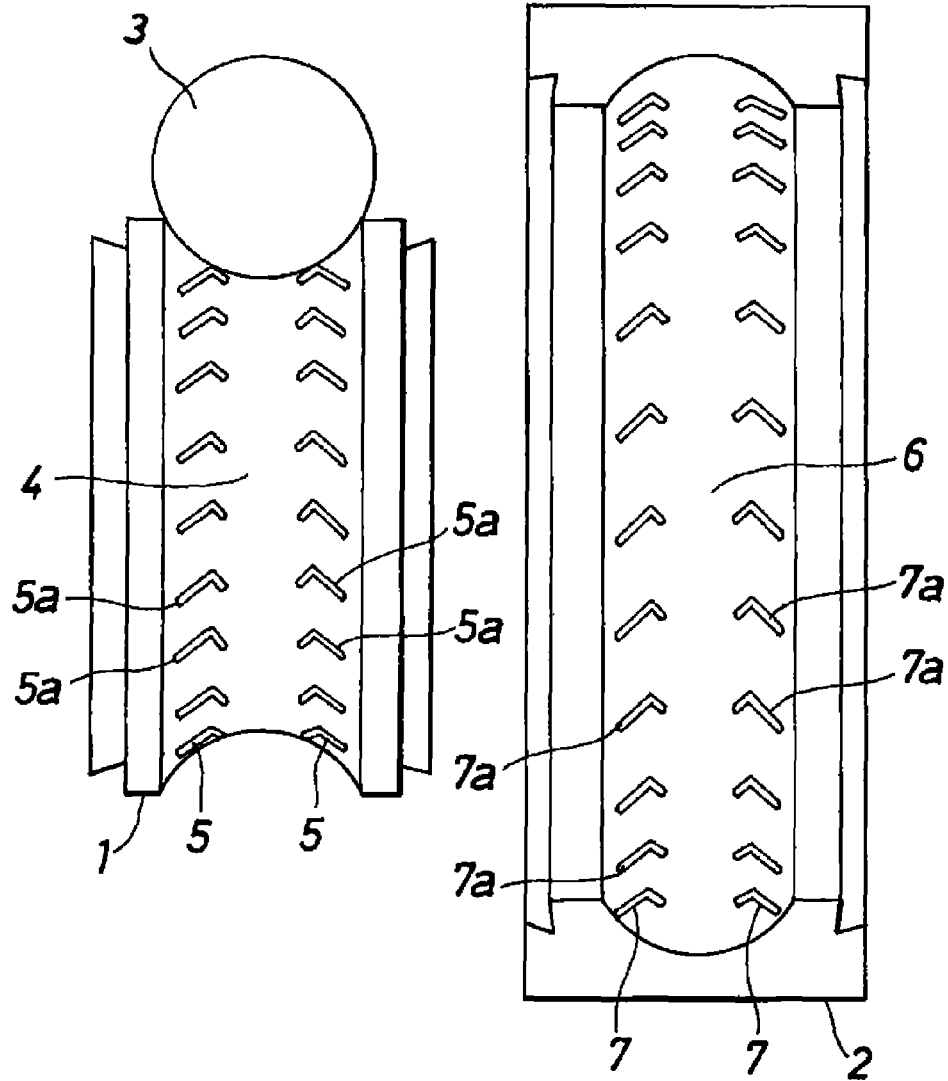
FIGS. 1A and 1B are views each of which shows an example of a bearing ring of a rolling bearing manufactured by a method of manufacturing a bearing ring of a rolling bearing according to the present invention, FIG. 1A showing an inner ring, and FIG. 1B showing an outer ring.

FIG. 1A shows an inner ring 1. A raceway groove 4 in which balls 3 roll is formed on an outer peripheral surface of the inner ring 1. Surface textures 5 are formed in axially opposite end portions of the raceway groove 4. FIG. 1B shows an outer ring 2. A raceway groove 6 in which the balls 3 roll is formed on an inner peripheral surface of the outer ring 2. Surface textures 7 are formed in axially opposite end portions of the raceway groove 6.

The surface textures 5, 7 are formed in order to provide a function of retaining lubricant, a function of supplying lubricant to the balls 3 and the center portion of the inner ring 1 or the outer ring 2, and a function of discharging extra lubricant from the bearing ring. Each of the surface textures 5, 7 includes a plurality of grooves 5a or 7a. In each of the examples shown in the figures, the plurality of grooves 5a or 7a is formed in a herringbone pattern. However, the pattern in which the grooves are formed is not limited to the herringbone pattern, and the grooves may be formed in any of various patterns such as a spiral pattern.

Each of the inner ring 1 and the outer ring 2 (hereinafter, referred to as "bearing rings 1, 2") is manufactured by performing heat treatment, grinding, and super-finishing on a bearing ring material in which the raceway groove is formed. In order to provide the surface textures 5, 7 in the raceway grooves 4, 6, it is conceivable to perform a process of forming the surface textures 5, 7 in the raceway grooves 4, 6 after the super-finishing process. As methods of forming the surface textures 5, 7 in the raceway grooves 4, 6 after the super-finishing process, methods using etching, ion beams, laser, micro-blasting and the like have been known. However, when any one of these methods of forming the surface textures 5, 7 is employed, the cost is high. This causes a problem that the manufacturing cost is greatly increased. Thus, in the method of manufacturing a bearing ring of a rolling bearing according to the present invention, the surface textures 5, 7 are formed by form rolling.

Figure 2:
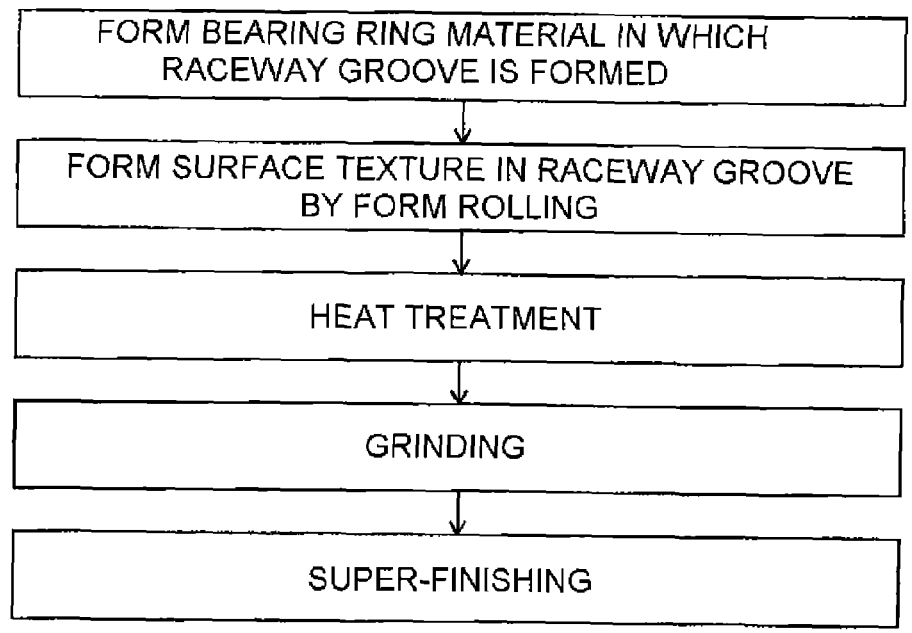
FIG. 2 is a process flowchart showing processes in a method of manufacturing a bearing ring of a rolling bearing in a first embodiment of the present invention.

FIG. 2 shows a method of manufacturing a bearing ring of a rolling bearing, according to a first embodiment of the present invention.

As shown in FIG. 2, the method of manufacturing a bearing ring of a rolling bearing in the first embodiment includes a process of forming a bearing ring material in which a raceway groove is formed, a process of performing form rolling so as to form surface textures in the raceway groove, a heat treatment process, a grinding process, and a super-finishing process.

The bearing ring material, in which the raceway groove is formed, may be formed by forging or turning.

Figure 4A:
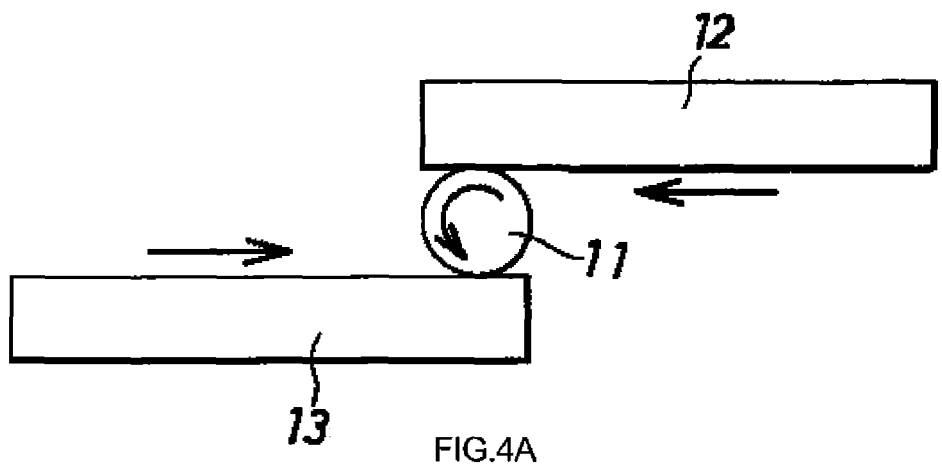
FIGS. 4A and 4B are views each of which schematically shows an example of form rolling.

For example, as shown in FIG. 4A, the form rolling is performed by holding the bearing ring material 11 between a flat die 12 having a groove pattern and a supporting plate 13, and then, moving the flat die 12 and the supporting plate 13 in opposite directions as indicated by arrows, respectively. Thus, on the outer peripheral surface of the bearing ring material 11, grooves are formed in a pattern corresponding to the groove pattern formed on the flat die 12.

Figure 4B:
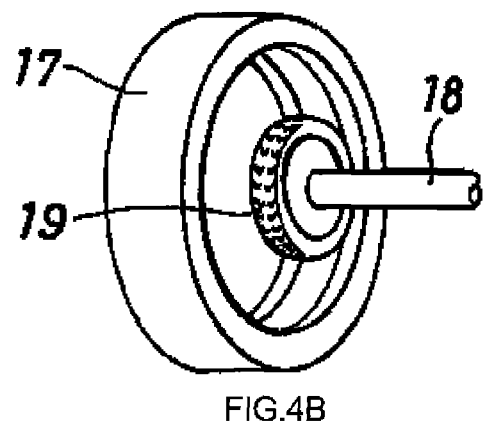

As shown in FIG. 4B, the form rolling is also performed by rolling a rolling tool 18 in a bearing ring material 17 from which the outer ring is formed. In the rolling tool 18, a groove pattern is formed on an outer peripheral surface of a disc 19. Thus, on the inner peripheral surface of the bearing ring material 17, grooves corresponding to rolling paths of the rolling tool 18 are formed.

The bearing rings 1, 2 are hardened up to a required degree of hardness in the heat treatment process. Since the bearing rings 1, 2 before the heat treatment process are not so hard in comparison with the bearing rings 1, 2 after the heat treatment process, it is possible to easily performing form rolling.

In the grinding process, in addition to the grinding of the raceway grooves 4, 6, width grinding, outer diameter grinding (in the case of the outer ring 2) and inner diameter grinding (in the case of the inner ring 1) are also performed. The depth of the grooves of the surface textures 5, 7 formed in the form rolling process is set taking into account that the depth of the grooves is decreased in the grinding process.

In the super-finishing process, super-finishing is performed on the raceway grooves 4, 6 and the surface textures 5, 7. The depths and areas of the grooves of the surface textures 5, 7 are adjusted in the super-finishing process.

Figure 3:
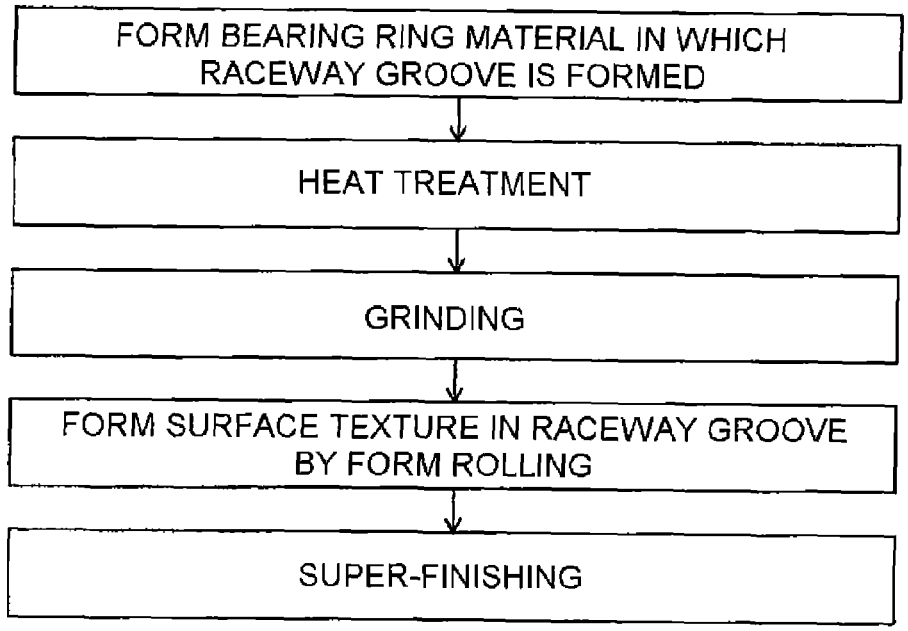
FIG. 3 is a process flowchart showing processes in a method of manufacturing a bearing ring of a rolling bearing ring in a second embodiment of the present invention.

FIG. 3 shows a method of manufacturing a bearing ring of a rolling bearing according to a second embodiment of the present invention.

The method of manufacturing a bearing ring of a rolling bearing according to the second embodiment includes a process of forming a bearing ring material in which a raceway groove is formed, a heat treatment process, a grinding process, a process of performing form rolling so as to form surface textures in the raceway groove, and a super-finishing process.

The second embodiment is different from the first embodiment in the order in which the process of performing form rolling so as to form the surface textures in the raceway groove is performed. That is, in the second embodiment, the form rolling is performed after the grinding process. Accordingly, it is not necessary to take into account that the depth of grooves in the surface textures 5, 7 formed in the form rolling process is decreased in the grinding process. Thus, it is possible to form the surface textures with high accuracy.

In the rolling bearing using the bearing rings 1, 2 in which the surface textures 5, 7 are thus formed, it is possible to obtain, for example, a function of reducing torque due to efficient discharge of oil through the surface textures. Further, it is possible to obtain a function of preventing seizure due to a function of retaining lubricant (grease) by the surface textures 5, 7.

If the depth of the grooves 5a, 7a in the surface textures 5, 7 is equal to or smaller than 1 μm, a preferable function of oil discharge, a preferable function of oil supply, and a preferable function of retaining lubrication oil are not likely to be obtained. Therefore, the depth of the grooves 5a, 7a in the surface textures 5, 7 is set to be equal to or greater than 5 μm. The upper limit of the depth of the grooves 5a, 7a is not limited to a particular value. However, it is preferable that the depth of the grooves 5a, 7a should be set to be equal to or smaller than 30 μm, taking the durability into account.

The lubrication method for the rolling bearing using the bearing rings 1, 2 in which the surface textures 5, 7 are formed is not limited to a particular method. Either lubrication by grease or lubrication by lubrication oil may be employed.

As shown in FIG. 1A and FIG. 1B, it is preferable that the surface textures 5, 7 should be formed in the end portions of the raceway grooves 4, 6. The contact pressures are high in the center portions (axially center portions) of the raceway grooves 4, 6, and accordingly, if the surface textures 5, 7 are formed in the center portions, the service life may be decreased by providing the surface textures 5, 7. By providing the surface textures in portions other than the center portions of the raceway grooves 4, 6, it is possible to improve the function of oil discharge, the function of oil supply, and the function of retaining lubrication oil, and to prevent the service life from being decreased.

It is preferable that the contact pressures in the portions, where the surface textures 5, 7 are formed, should not exceed the maximum contact pressures in the portions where the surface textures 5, 7 are not formed (the center portions of the raceway grooves 4, 6). In the case where the surface textures 5, 7 are formed on the surfaces of the raceway grooves 4, 6, the contact areas are decreased by values corresponding to the areas of the grooves 5a, 7a in the surface textures 5, 7, and as a result, the contact pressures are increased. The increase of the contact pressures leads to the decrease of the service life. If the contact pressures in the portions where the surface textures 5, 7 are formed are prevented from exceeding the maximum contact pressures in the portions where the surface textures 5, 7 are not formed, it is possible to restrain the service life from being decreased by providing the surface textures 5, 7. The contact pressures can be calculated on the basis of the Hertzian theory. For example, the contact pressures in the portions where the surface textures 5, 7 are formed can be adjusted by setting the ratios between the areas of the grooves 5a, 7a and the areas of the portions where the grooves 5a, 7a are not formed, to values equal to or smaller than required values.

In the method of manufacturing a bearing ring of a rolling bearing according to the present invention, the surface textures are formed on the surface of a raceway groove, and thus, it is possible to improve the function of oil discharge, the function of oil supply, and the function of retaining lubrication oil. Further, the surface textures are formed by performing form rolling, and thus, it is possible to manufacture a bearing ring of a rolling bearing, which has surface textures, at low cost.

What is claimed is:

1. A method of manufacturing a bearing ring of a rolling bearing, comprising
    forming a bearing ring having a raceway groove,
    performing heat treatment, grinding, and super-finishing on the bearing ring, and
    performing form rolling on a surface of the raceway groove of the bearing ring so as to form a surface texture on the surface of the raceway groove, wherein the performing the form rolling is conducted either (a) before the heat treatment or (b) between the grinding and the super-finishing, and wherein the surface texture includes surface textures formed in axially opposite end portions of the raceway groove and wherein a center portion of the raceway groove between the axially opposite end portions of the raceway groove does not include the surface texture.

2. The method of manufacturing a bearing ring of a rolling bearing according to claim 1, wherein a contact pressure in a portion of the surface of the raceway groove where the surface texture is formed does not exceed a maximum contact pressure in a portion of the surface of the raceway groove wherein the surface texture is not formed.

3. The method of manufacturing a bearing ring of a rolling bearing according to claim 1, wherein the surface texture comprises a plurality of grooves.

4. The method of manufacturing a bearing ring of a rolling bearing according to claim 3, wherein the plurality of grooves are formed in a regular repeating pattern.

5. The method of manufacturing a bearing ring of a rolling bearing according to claim 1, wherein the surface texture comprises a plurality of grooves, each groove of the plurality of grooves having a depth of ≥5 μm.

6. The method of manufacturing a bearing ring of a rolling bearing according to claim 1, wherein the surface texture comprises a plurality of grooves, each groove of the plurality of grooves having a depth of from 5 μm to 30 μm.

7. The method of manufacturing a bearing ring of a rolling bearing according to claim 1, wherein the performing the form rolling is conducted before the heat treatment.

8. The method of manufacturing a bearing ring of a rolling bearing according to claim 1, wherein the performing the form rolling is conducted between the grinding and the super-finishing.

* * * * *